No. 682,963. Patented Sept. 17, 1901.
C. T. STARKEY.
COTTON SEED PLANTER AND FERTILIZER DISTRIBUTER.
(Application filed May 6, 1901.)
(No Model.) 2 Sheets—Sheet 1.
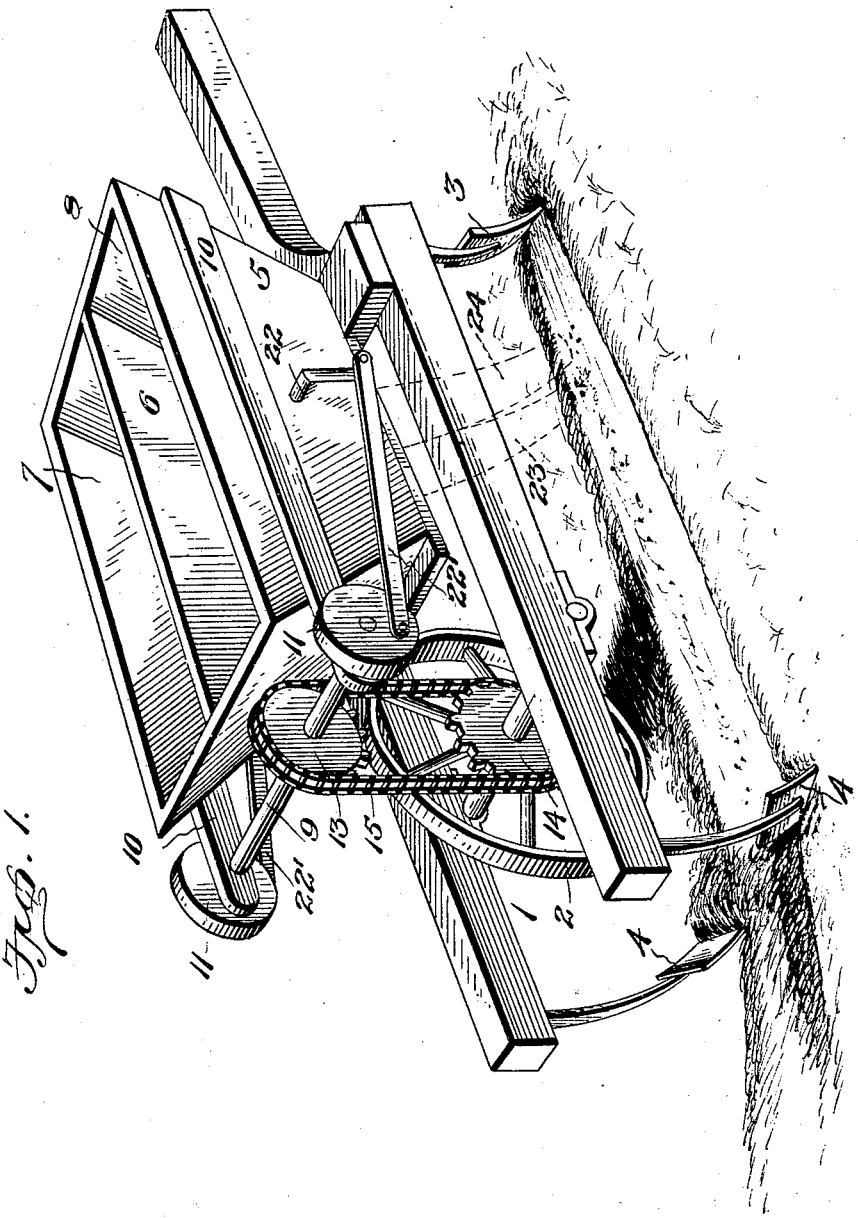

No. 682,963. Patented Sept. 17, 1901.
C. T. STARKEY.
COTTON SEED PLANTER AND FERTILIZER DISTRIBUTER.
(Application filed May 6, 1901.)
(No Model.) 2 Sheets—Sheet 2.
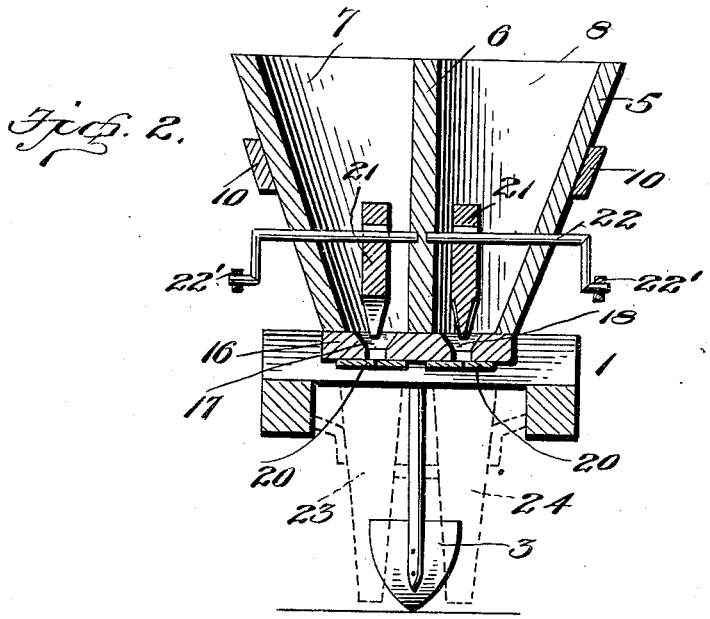
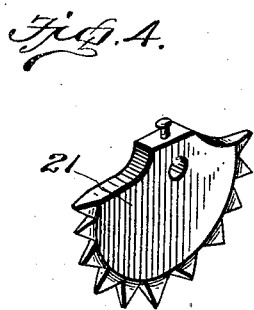
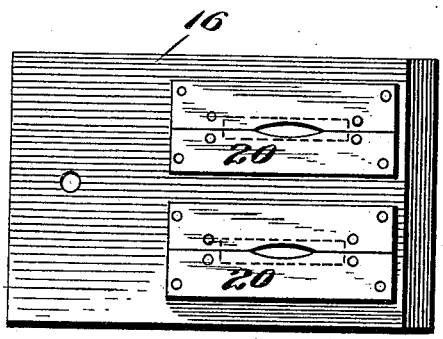
Witnesses
Inventor
C. T. Starkey
By H. D. Wilson & Co
Attorneys
THE NORRIS PETERS CO., PHOTO-LITHO., WASHINGTON, D. C.

UNITED STATES PATENT OFFICE.

CHARLES THOMAS STARKEY, OF ATTALLA, ALABAMA.

COTTON-SEED PLANTER AND FERTILIZER-DISTRIBUTER.

SPECIFICATION forming part of Letters Patent No. 682,963, dated September 17, 1901.

Application filed May 6, 1901. Serial No. 58,942. (No model.)

*To all whom it may concern:*

Be it known that I, CHARLES THOMAS STARKEY, a citizen of the United States, residing at Attalla, in the county of Etowah and State of Alabama, have invented certain new and useful Improvements in Cotton-Seed Planters and Fertilizer-Distributers; and I do declare the following to be a full, clear, and exact description of the invention, such as will enable others skilled in the art to which it appertains to make and use the same.

The invention relates to a cotton-seed planter and guano-distributer.

The object of the invention is to provide a machine of this character which shall be simple of construction, durable in use, comparatively inexpensive of production, and which may be used for planting cotton-seed or distributing guano separately or in conjunction, thus making one machine serve the use of two.

With this and other objects in view the invention consists of certain novel features of construction, combination, and arrangement of parts, which will be hereinafter more fully described, and particularly pointed out in the appended claim.

In the accompanying drawings, Figure 1 is a perspective view of my improved cotton-seed planter and fertilizer-distributer. Fig. 2 is a vertical cross-sectional view. Fig. 3 is a bottom plan view of the removable bottom of the hopper, and Fig. 4 is a detail perspective view of one of the expelling-disks.

Referring to the drawings, 1 denotes the supporting-frame of the machine, which may be of any well-known and approved construction.

2 denotes the drive-wheel, journaled in the frame in any suitable manner.

3 denotes a furrow-opener carried by the forward end of the frame, and 4 denotes the coverers carried by the rear end of the side bars of the machine.

5 denotes a hopper supported upon the frame 1 and divided by a partition 6 into compartments 7 and 8.

9 denotes a shaft journaled in brackets 10, secured to the sides of the hopper and provided at its ends with crank-wheels 11, which are driven by the wheel 2 through a sprocket-gearing consisting of wheels 13 and 14 and chain 15.

16 denotes the bottom of the hopper, which is provided with flaring apertures 17 and 18, communicating with the compartments of the hopper, and underneath the bottom are secured elastic strips 20, through which the seed and fertilizer from the compartments are adapted to be forced. The means shown for forcing the contents of the compartments between the elastic strips of the bottom comprise segmental expelling-disks 21, mounted upon rock-shafts 22, journaled in the hopper, said shafts 22 being connected to the crank-wheels 11 by rods 22'. Each expelling-disk is provided with a serrated or corrugated edge, which projects downwardly into the apertures of the bottom of the hopper and tends to force the seed and fertilizer which had previously accumulated in said apertures above the elastic strips through said elastic strips into the seed and fertilizer conducting tubes 23 and 24. These disks are secured to the shafts 22 by a set-screw, whereby said disk will be permitted to have a radial adjustment on said shafts, whereby they may be set so that more or less of their working edges will rock through the apertures in the bottom of the hopper, thus enabling me to vary the amount of material forced therethrough.

From the foregoing description, taken in connection with the accompanying drawings, the construction, operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a machine of the character described, the combination of the main frame, a furrow-opener at the forward end and a furrow-closer located at the rear end, a drive-shaft journaled in said main frame and provided with a drive-wheel, a sprocket-wheel fixed to said shaft, a hopper supported upon the main frame and provided with a discharge-orifice in its bottom through which the seed or fertilizer is adapted to be forced, a rock-shaft having a crank at one end, a segmental expelling-disk radially adjustably secured to said rock-shaft and provided with teeth upon its periphery adapted to force the material through the discharge-opening in the bottom of the hopper, a counter-shaft journaled in bearings projecting from the hopper and provided with a fixed sprocket-wheel, a sprocket-chain connecting the two sprocket-wheels, a crank-wheel connected to said counter-shaft, a link connecting the crank of the rock-shaft to the crank-wheel, and an elastic strip secured under the bottom of the hopper immediately under the discharge-opening in said bottom, substantially as set forth.

In testimony whereof I have hereunto set my hand in presence of two subscribing witnesses.

CHARLES THOMAS STARKEY.

Witnesses:
V. L. NICHOLSON,
JAMES THOMAS.